(No Model.)
W. RICHWINE.
TIRE FOR VELOCIPEDES.
No. 442,393. Patented Dec. 9, 1890.
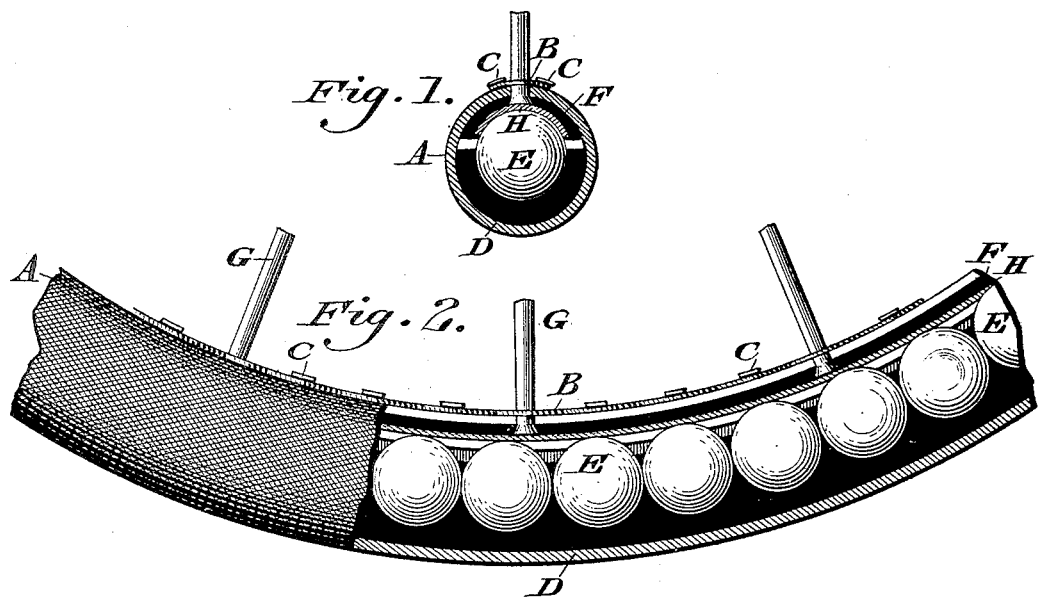
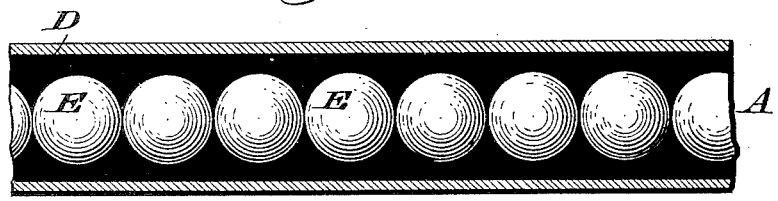
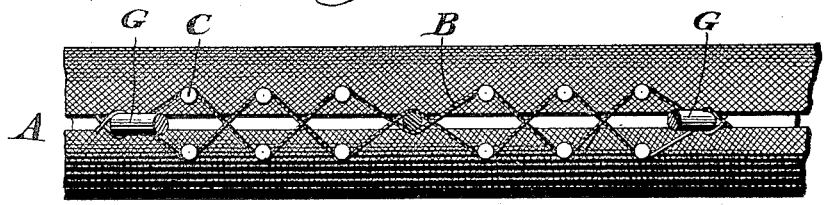
WITNESSES:
INVENTOR.
William Richwine.
BY
ATTORNEY.

UNITED STATES PATENT OFFICE.

WILLIAM RICHWINE, OF PHILADELPHIA, PENNSYLVANIA.

TIRE FOR VELOCIPEDES.

SPECIFICATION forming part of Letters Patent No. 442,393, dated December 9, 1890.

Application filed October 6, 1890. Serial No. 367,230. (No model.)

*To all whom it may concern:*

Be it known that I, WILLIAM RICHWINE, a citizen of the United States, residing in the city and county of Philadelphia, State of Pennsylvania, have invented a new and useful Improvement in Tires for Bicycles and other Vehicles, which improvement is fully set forth in the following specification and accompanying drawings.

My invention consists of a tire formed of a tube and elastic balls which are seated in an elastic bed in said tube, and thereby prevented from displacement, the combined action of the parts producing a highly elastic, easy-riding, and durable tire. Provision is made for access to the interior of the tube and other features are presented, as will be hereinafter fully set forth.

Figure 1 represents a transverse section of a tire embodying my invention. Fig. 2 represents a partial side elevation and partial longitudinal section thereof. Fig. 3 represents a longitudinal section at a right angle to that shown in Fig. 2. Fig. 4 represents a view taken on the inner periphery of the tire.

Similar letters of reference indicate corresponding parts in the several figures.

Referring to the drawings, A designates a tube constituting the tire proper, the same being formed of suitable fabric, such as rubber cloth, which is bent into shape, and has is ends brought together at the inner periphery of the tube and retained in closed and approximately closed position by means of lacings B, which are passed around studs or pins C on the tube on opposite sides of the ends of said tube.

D designates a bed of rubber or other elastic material, which occupies a portion of the tube A and is provided with pockets or depressions, in which are seated the rubber balls E, which, as will be seen, are arranged side by side throughout the tube, and are solid or hollow, as desired.

F designates a rim or plate of metal or other rigid material, which is located within the tube A at the inner periphery thereof, and having secured to it the spokes G of the wheel of which the tire constitutes a part, said spokes passing from said rim through the opening formed by the ends of the tube, as will be most plainly seen in Fig. 4.

Interposed between the rim F and the balls E is a piece or strip H, of felt or other fabric or soft material, forming a cushion and preventing contact of the balls and rim. It will be seen that the balls are held in position within the tube owing to the pockets of the seat, and thus prevented from shifting, and as said balls and the seat are elastic in their nature the tire will be found to be of a highly elastic nature, and its riding qualities consequently of a superior order. Access is had to the balls for removal of the same or other purposes by loosening the lacing and separating the tube, when the balls and bed may be displaced, the same being true of the spokes, rim, and contiguous cushion, it being also evident that when the bed, &c., is placed within the tube the latter may be closed around the same and secured by the lacing B, the parts thus being retained in position and the structure of the tube preserved.

Having thus described my invention, what I claim as new, and desire to secure by Letters Patent, is—

1. A tire consisting of a tube with a pocketed bed and balls therein, said balls resting in said bed, substantially as described.

2. A tire having a divided tube of flexible or elastic material, with means for lacing or connecting the ends of the same, substantially as described.

3. A tire consisting of a tube with balls and a spoke-attaching rim therein, said rim being located between the balls and inner periphery of the tube, substantially as described.

4. A tire consisting of a tube with a pocketed bed, balls in said bed, and a spoke-attaching rim therein, substantially as described.

5. A tire consisting of a tube with balls, a spoke-attaching rim and a cushion therein, the latter being between said balls and rim, substantially as described.

6. A tire consisting of a tube with a pocketed bed, balls on said bed, and a spoke-attaching rim, said tube being divided and provided with means for closing the same, substantially as described.

WILLIAM RICHWINE.

Witnesses:
JOHN A. WIEDERSHEIM,
A. P. JENNINGS.